United States Patent [19]
Abbiss et al.

[11] Patent Number: 5,313,263
[45] Date of Patent: May 17, 1994

[54] SYSTEM FOR, AND METHOD OF, DETERMINING THE SPEED OF AN AIRBORNE VEHICLE

[75] Inventors: John B. Abbiss, Irvine; Anthony E. Smart, Costa Mesa, both of Calif.

[73] Assignee: The Titan Corporation, San Diego, Calif.

[21] Appl. No.: 933,226

[22] Filed: Aug. 21, 1992

[51] Int. Cl.$^5$ .............................................. G01P 3/36
[52] U.S. Cl. ..................................... 356/28.5; 356/28
[58] Field of Search ................................. 356/28, 28.5

[56] References Cited

U.S. PATENT DOCUMENTS

| | | | |
|---|---|---|---|
| 3,984,685 | 10/1976 | Fletcher et al. | 356/28.5 |
| 4,340,299 | 7/1982 | Mongeon | 356/28.5 |
| 4,735,503 | 4/1988 | Werner et al. | 356/28.5 |
| 4,995,720 | 2/1991 | Amzajerdian | 356/28.5 X |
| 5,172,181 | 12/1992 | Morbieu et al. | 356/285 |

*Primary Examiner*—Mark Hellner
*Attorney, Agent, or Firm*—Ellsworth R. Roston; Charles H. Schwartz

[57] ABSTRACT

This system measures the speed of an airborne vehicle relative to the surrounding atmosphere. The measurement is based on the scattering of pulses of coherent laser radiation, generated in the vehicle, preferably in the infrared region of the electromagnetic spectrum, by particles naturally present in the atmosphere at all times. The pulses are focused into the atmosphere at a sufficient distance from the vehicle, preferably 10–30 meters, to be beyond that region perturbed by the passage of the vehicle. The frequency of the radiation scattered by the particles differs from the frequency of the transmitted pulses by virtue of the relative motion of the vehicle and the atmosphere. Equipment in the vehicle digitally processes the received energy to determine this frequency difference for each pulse, and hence the component of the vehicle's velocity in the direction of the pulse transmission. Successive pulses are transmitted into the atmosphere in differing directions lying on the surface of a cone whose axis is fixed with respect to the vehicle, making possible the vectorial determination of the vehicle's relative motion. This conical scan is repeated without interruption over successive cycles of pulses. In determining the vehicle's velocity vector from the measured velocity components, account is taken, through weighting factors, of the statistically variable quality of the individual measurements from successive pulses. These weighting factors are derived from the properties of the measurements themselves and are applied to the data to enhance both accuracy and continuity of information.

38 Claims, 5 Drawing Sheets

SYSTEM FOR, AND METHOD OF, DETERMINING THE SPEED OF AN AIRBORNE VEHICLE

BACKGROUND OF THE INVENTION

This invention relates to a system for, and method of, determining atmospheric data relating to the movements of an airborne vehicle. More particularly, the invention relates to a system included in an airborne vehicle for using energy scattered from aerosol particles in the atmosphere to determine the vectorial speed of movement of the airborne vehicle relative to the aerosol particles. The system and method of this invention are especially adapted to determine the vehicle speed relative to that of the particles at a position sufficiently removed from the airborne vehicle to avoid any disturbance created by the movement of the airborne vehicle but sufficiently close to the airborne vehicle to indicate accurately the movement of the airborne vehicle with respect to the particles.

Mechanical instruments have long been used to measure the relative speed between a moving object such as an airborne vehicle and the free airstream through which the airborne vehicle is moving. The mechanical instruments determine the kinetic pressure exerted in a first defined area disposed on the vehicle in the direction of movement of the vehicle. The mechanical instruments also determine the static pressure exerted on a second defined area disposed on the airborne vehicle in substantially perpendicular relationship to the first defined area. The systems then compare the kinetic and static pressures to determine the relative air speed of the vehicle.

The mechanical instruments now in use typically employ Pitot tubes, pneumatic tubing and pressure transducers which are exposed to the external environment and are accordingly subject to degraded performance resulting from calibration changes from various causes such as component aging or changes in temperature. They are also subject to catastrophic failures as a result of accidental breakage. Furthermore, they protrude physically into the airflow.

As air navigation becomes increasingly complex, it becomes important to determine other data than the movement of the airborne vehicle relative to the ground. For example, it becomes increasingly important to know the characteristics of the air flow around the vehicle at each instant so that the response of the vehicle to such air flow can be properly controlled. For example, the air flow around the vehicle may affect the rate at which the yaw and pitch of the vehicles may be safely varied. The equipment now in use and discussed in the previous paragraphs has not been found satisfactory to provide the sensitive and accurate data which is now often required to control the rate at which the attitude of the vehicle can be safely varied.

A considerable effort has been made for a long period of time, and substantial sums of money have been expended during such period, to develop a system which will overcome the disadvantages discussed above. For example, systems have been developed using aerosol particles in the atmosphere to obtain desired air data. Such systems have directed energy from the airborne vehicle in such forms as substantially coherent light and/or radiation to the aerosol particles and have received coherent light scattered from the aerosol particles. Such systems have then processed the received signals to obtain the desired data. Although such systems appear to be promising, they have not yet demonstrated the performance that will be realized by this invention and they do not provide as accurate, sensitive and reliable information as may otherwise be desired and that will be attained by this invention.

In U.S. Pat. No. 4,887,213 issued to Anthony E. Smart and Roger P. Woodward on Dec. 12, 1989, for a "System For, and Methods of, Providing for a Determination of the Movement of an Airborne Vehicle in the Atmosphere" and assigned of record to the assignee of record of this application, a system is disclosed and claimed for overcoming the above disadvantages. In one embodiment, light generated from a moving airborne vehicle and scattered from particles in the atmosphere produces, at first and second detectors at the vehicle, signals indicative of such scattered light. The detected signals are converted in the system of U.S. Pat. No. 4,887,213 to digital signals. The digital signals from each particle are grouped. A centroid, based upon a weighting of the signals in each group in accordance with amplitude and time, is determined to represent the most probable time at which the particle crosses the peak of the illuminated region.

The peak amplitude of each signal from a first detector in the system of U.S. Pat. No. 4,887,213 is paired with the peak amplitude of the successive signals from a second detector. The time difference between the paired signals, and their product amplitudes, are determined. The amplitude products are separated into successive bins on the basis of the time difference between the signals in each pair. The amplitude products in each bin are averaged. The bin with the greatest average amplitude product and the two (2) adjacent time bins are then selected.

The median time in the bin in the system of U.S. Pat. No. 4,887,213 having the highest average product amplitude is used as a first approximation to the transit time of a particle between the two sheets. An estimate with enhanced accuracy may be obtained by calculating the "centroid", by a method analogous to that used above, of the distribution of events in the three (3) chosen bins. The movement of the airborne vehicle may be determined from the selected time difference.

SUMMARY OF THE INVENTION

This invention provides a system and method which have all of the advantages of the system of U.S. Pat. 4,887,213 and have a number of distinctive additional advantages. The system and method of this invention are able to determine the vehicle speed of an airborne vehicle relative to aerosol particles considerably closer to the aircraft than even the system of U.S. Pat. No. 4,887,213. The system and method of this invention determine the vectorial speed of the airborne vehicle relative to the aerosol particles in the direction of movement of the airborne vehicle by changes in frequency rather than on the basis of changes in time as in the system of U.S. Pat. No. 4,887,213.

The system and method of this invention use pulses of laser energy rather than a continuous laser energy as in the system of U.S. Pat. No. 4,887,213. Furthermore, the laser energy in the system of this energy is coherent as distinguished from the system of U.S. Pat. No. 4,887,213. The laser energy in the system of this invention may be in any portion of an infrared bandwidth as distinguished from laser energy in the low end of the infrared bandwidth in the system of U.S. Pat. No. 4,887,213.

The system and method of this invention use only a single detector as distinguished from the plurality of detectors included in the system of U.S. Pat. No. 4,887,213. The system and method of this invention generate energy pulses to aerosol particles and are able to receive energy pulses scattered from the aerosol particles even before the generation of the energy pulses has been completed. FIG. 3 also shows in additional detail the processing of the signals by the digital processor 68. The signals from the digital processor 68 in FIG. 3 are used to locate the peak 70 in FIG. 5. This is indicated by broken lines 80 extending from the digital signal processor 68 to a box numerically indicated at 82 and designated as "Locate Peak" in FIG. 3. The location of the peak is then processed in a centroiding operation indicated at 84 and the signals representing the computed centroid are then introduced to a stage 86 for assembling the data vector and weighting the matrix as discussed above. The matrix is then processed algebraically as discussed above in stages indicated at 88 in FIG. 3. The processing of the matrix occurs in accordance with the introduction to the stages 88 from stages 90 of signals indicating the matrix of the direction cosines of the beam direction. The processing may occur in the stages 90 in accordance with the vector containing the velocity components of the aircraft 10 as discussed above.

In one embodiment of the invention, a system is disclosed for measuring the speed of an airborne vehicle relative to the surrounding atmosphere. The measurement is based on the scattering of pulses of coherent laser radiation, generated in the vehicle, preferably in the infrared region of the electromagnetic spectrum, by particles naturally present in the atmosphere at all times. The pulses are focused into the atmosphere at a sufficient distance from the vehicle, preferably 10-30 meters, to be beyond that region perturbed by the passage of the vehicle.

The frequency of the radiation scattered by the particles differs from the frequency of the transmitted pulses by virtue of the relative motion of the vehicle and the atmosphere. Equipment in the vehicle digitally processes the received energy to determine this frequency difference for each pulse, and hence the component of the vehicle's velocity in the direction of the pulse transmission.

Successive pulses are transmitted into the atmosphere in differing directions lying on the surface of a cone whose axis is fixed with respect to the vehicle, making possible the vectorial determination of the vehicle's relative motion. This conical scan is repeated without interruption over successive cycles of pulses. In determining the vehicle's velocity vector from the measuring velocity components, account is taken, through weighting factors, of the statistically variable quality of the individual measurements from successive pulses. These weighting factors are derived from the properties of the measurements themselves and are applied to the data to enhance both accuracy and continuity of information.

A spatial cone is generated from the vehicle by a particular number of the energy pulses each having an individual spatial disposition and each having a particular frequency. The energy pulses scattered by the particles may be received at the airborne vehicle during the time that the energy pulses are generated into the atmosphere.

The generated energy pulses and the scattered energy pulses are processed as in digital form, on the basis of differences in frequency between the generated and scattered energy pulses, to determine the vectorial speed of the vehicle relative to the aerosol particles. In such processing, matrices are defined by the absolute speed determined for the vehicle relative to the particles scattering the energy and by the angle at which such energy is generated relative to the direction of the vehicle movement. Various factors may affect the weighting of the components in each matrix. These include the amplitudes of the energy pulses scattered by the particles and received by the vehicle and the signal-to-noise ratios of the scattered energy in the pulses.

DESCRIPTION OF THE PREFERRED EMBODIMENT

In one embodiment of the invention, an airborne vehicle such as an aircraft generally indicated at 10 (FIG. 8) includes a system generally indicated at 12 (FIGS. 1–3) for determining the speed of the aircraft relative to the aerosol particles. This determination is made with respect to aerosol particles in the vicinity of the aircraft 10. The determination is made by transmitting pulses of energy such as laser energy in a conical array of beams indicated schematically at 14 in FIGS. 1 and 8. The pulses of energy are coherent and may have a bandwidth in any portion of the infrared range. The pulses of energy are produced by a laser 30 shown in FIG. 2. An angle having a suitable value such as approximately thirty degrees (30°) may be formed between the axis of the cone and the periphery of the cone.

Figure 1:
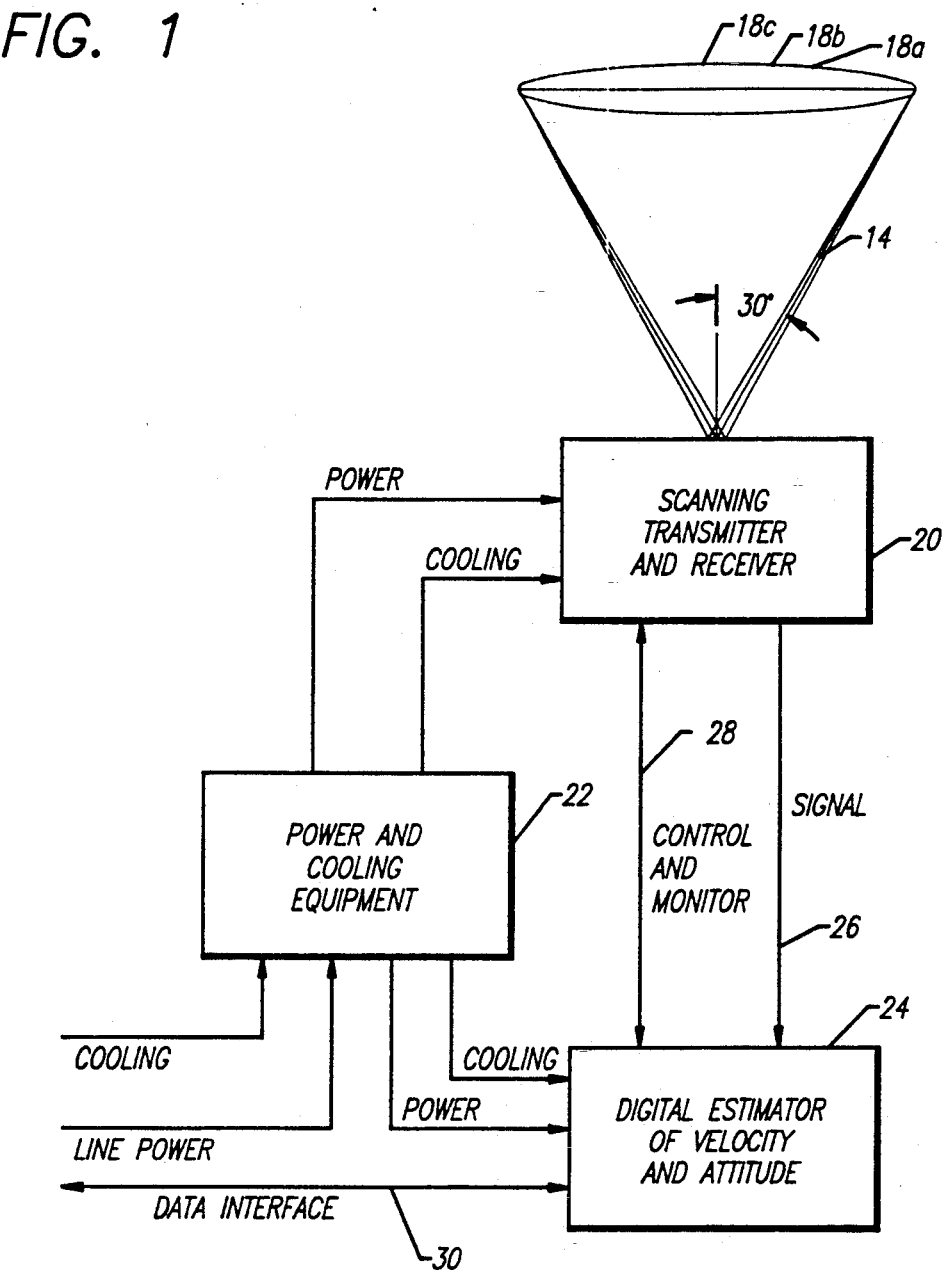
FIG. 1 is a schematic block diagram of a system constituting one embodiment of an invention for determining the speed of a vehicle relative to airborne particles in the vicinity of the vehicle.

The pulses of energy may be produced by the laser 30 at a particular frequency such as approximately three hundred (300) times per second. After each production of twelve (12) energy pulses, a conical scan is completed. This means that progressive positions such as those illustrated at 18*a*, 18*b*, 18*c*, etc. in FIG. 1 are scanned sequentially in the conical scan. Each of the progressive positions 18*a*, 18*b*, 18*c*, etc. in the conical scan is separated by an angle of approximately thirty degrees (30°) from the adjacent positions in the conical scan. Approximately twenty-five (25) conical scans may be completed in one second (1 sec.). Because of this, a suitable number of laser pulses such as approximately three hundred pulses are produced per second (300/sec.).

The system 12 is adapted to determine the speed of the vehicle 10 relative to aerosol particles which are disposed in the vicinity of the airborne vehicle 10. This distance is sufficiently displaced from the airborne vehicle 10 so that the flow distribution created in the air by the disposition and the movement of the aircraft 10 does not affect the movement of the particles. The distance is sufficiently close to the airborne vehicle so that the speed of the vehicle is determined in the immediate vicinity of the airborne particles. For example, the distance of the aerosol particles may be approximately ten (10) to thirty (30) meters.

The system 12 is partially shown on a block diagram basis in FIG. 1. The system includes a scanning transmitter and receiver 20 which generates the energy pulses 18*a*, 18*b*, 18*c*, etc. into the atmosphere and receives the energy pulses scattered from the aerosol particles in the atmosphere. The transmitter/receiver 20 receives power from, and is cooled by, power and cooling equipment 22. Power and cooling are also introduced from the equipment 22 to a digital estimator 24 of the velocity and attitude of the aerosol particles. The digital estimator 24 estimates the velocity and attitude of the aircraft 10 relative to the aerosol particles on the basis of signals introduced to the digital estimator from the transmitter/receiver 24 through lines 26. Lines 26 are provided between the transmitter/receiver 20 and the digital estimator 24 to provide controls in the operation of the digital estimator and the transmitter/receiver and to monitor the operation of these stages. The output from the digital estimator 24 is introduced to a line 30.

FIG. 2 illustrates the transmitter/receiver 20 in additional detail. As shown in FIG. 2, the transmitter/receiver 20 includes the laser 30. The energy pulses from the laser are reflected by a mirror 32 which may be constructed in a conventional manner. The light energy from the mirror 32 may be reflected to a mirror 34 which also may be constructed in a conventional manner. The light energy is reflected by the mirror 34 to a plate 36 which may be made from a suitable material such as germanium and which may be constructed in a conventional manner. The plate 36 is disposed at a suitable angle such as a Brewster angle relative to the light from the mirror 34. Because of the Brewster angle, a portion of the light passes through the plate 36 to a plate 38, and a portion of the light passes through the plate 36 to a lens 54, depending upon the polarization of the light.

The plate 38 may be constructed in a conventional manner. For example, the plate 38 may constitute a quarter wave plate slightly inclined relative to an angle perpendicular to the light passing through the plate 36. After passing through the plate 38, the light is directed to a tiltable wedged sampler 40 (constructed in a conventional manner) for a reference beam. The light energy is then reflected by a mirror 42 to a concentrating lens 44 which is included in a conical scanner and telescope 46. The light subsequently passes to a reflector 48 which is also included in the conical scanner and telescope 46. The light energy is then directed through a window 50 into the atmosphere. The window 50 may be constructed in a conventional manner and may be formed from a coated germanium plate.

The light energy passing through the window 50 travels to aerosol particles in the air. The aerosol particles scatter some of the light energy back through the window 50 to the reflector 48. The reflector 48 in turn focuses the reflected light on the lens 44. The light energy then passes to the mirror 42 and then through the tiltable wedged sampler 40 and the quarter wave plate 38 to the plate 36. The plate 36 reflects the light to the lens 54 which focuses the light on a detector 56. The detector 56 may be constructed in a conventional manner. The detector 56 may be of the mercury cadmium tellurium ($H_gCdTe$) type and may be cooled.

Since the aerosol particles are only approximately ten meters (10 m) to thirty meters (30 m) from the airborne vehicle 10, the detector 56 may receive the energy pulses scattered from the aerosol particles during the time that such energy pulses are being directed from the laser 30 through the window 50. The energy pulses passing to the window 50 after being scattered by the aerosol particles have a different frequency than the energy pulses passing to the window 56 through a path including the laser 30, the mirrors 32 and 34, the plate 36 and the lens 44. This results from the Doppler effect (well known in the art for other applications) produced on the light energy as a result of the movement of the aerosol particles along its optical axis. For example, the frequency of the energy in each pulse is increased after being scattered by the aerosol particles when the vehicle is moving towards the aerosol particles. Similarly, the frequency of the energy in each pulse is decreased after being scattered by the aerosol particles when the vehicle is moving away from aerosol particles.

The electrical circuitry shown in FIG. 3 detects the difference in the frequency of the light energy from the laser 30 and the light energy passing through the window 50 after being scattered by the aerosol particles. The electrical circuitry shown in FIG. 3 includes the detector 56 also shown in FIG. 2. The signals produced by the detector 56 may coincide, for a portion of the time of each energy pulse from the laser 30, with the energy pulses from the laser. The signals received by the detector 56 are amplified in a pre-amplifier stage 60 and then in an amplifier stage 62. The amplified signals may then be subject to an automatic gain control stage (not shown).

The analog signals in the amplifier 60 are then converted to a digital form in a converter 64. Each conversion may be represented by a plurality of bits in a binary code depending upon the accuracy desired for the conversion. For example, each analog signal may be converted to binary signals of eight (8) bits or sixteen (16)

bits. These bits may be produced at a particular rate such as two hundred and fifty six megahertz (256 Mhz) per second.

The digital signals may then be subjected to a frequency transform such as a fast Fourier transform in a stage 66. Fast Fourier transforms are well known in the art to convert signals in the time domain to signals in the frequency domain. The signals in the frequency domain from the stage 66 are then processed in a stage 68 to determine the speed of the vehicle 10 relative to the aerosol particle.

Figure 5:
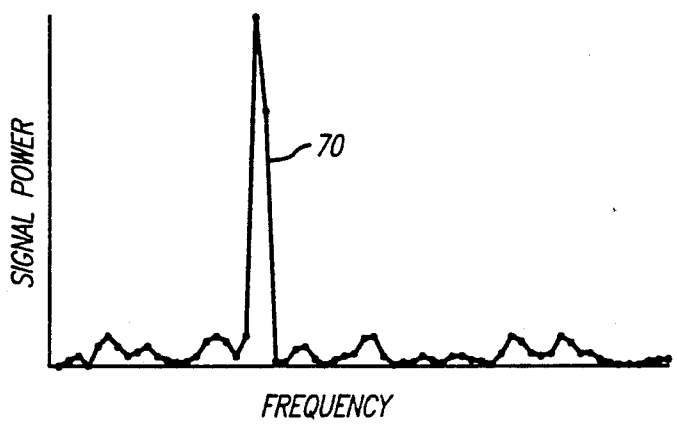
FIG. 5 is a curve schematically illustrating how the speed of the airborne vehicle relative to airborne particles in the vicinity of the vehicle is determined on the basis of variations in a detected frequency.

FIG. 5 illustrates the relationship between the frequency and the power of the energy scattered from a particle to the airborne vehicle 10. As will be seen, a signal 70 with a relatively large amount of power is predominant in the frequency spectrum of FIG. 5 to indicate the frequency of the energy scattered from the particle to the vehicle 10.

Figure 8:
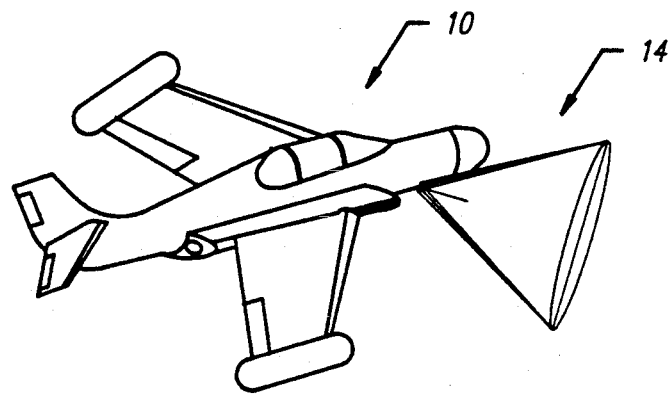
FIG. 8 is a schematic diagram illustrating how the system shown in FIGS. 1–3 is disposed on the airborne vehicle, and further illustrating the cone of energy generated by successive pulses from such system, to determine the speed of airborne vehicle relative to the aerosol particles.
Figure 2:
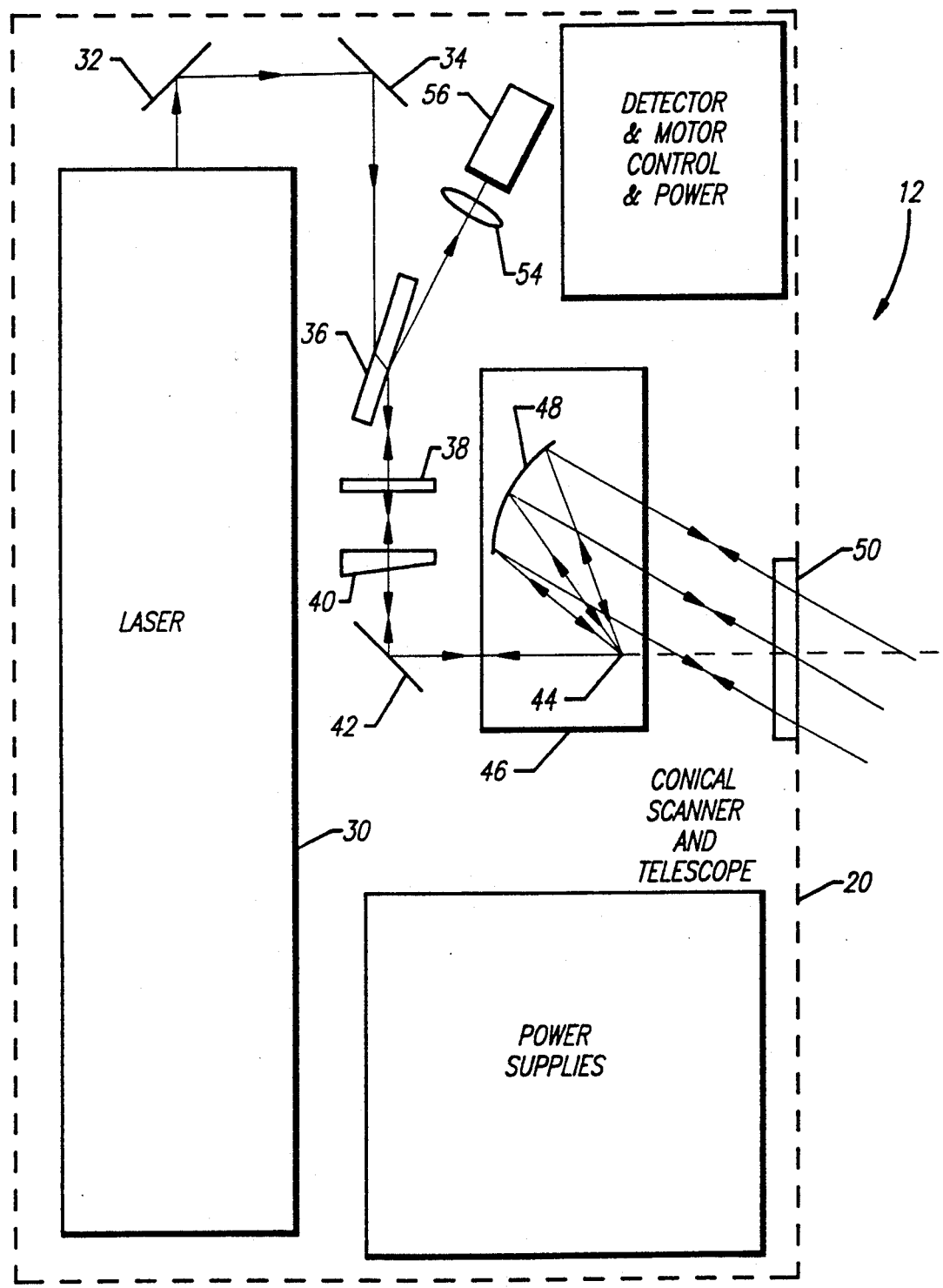
FIG. 2 is a schematic block diagram illustrating in additional detail a transmitter/receiver, and certain optical features of such transmitter/receiver, included in the system shown in FIG. 1.
Figure 3:
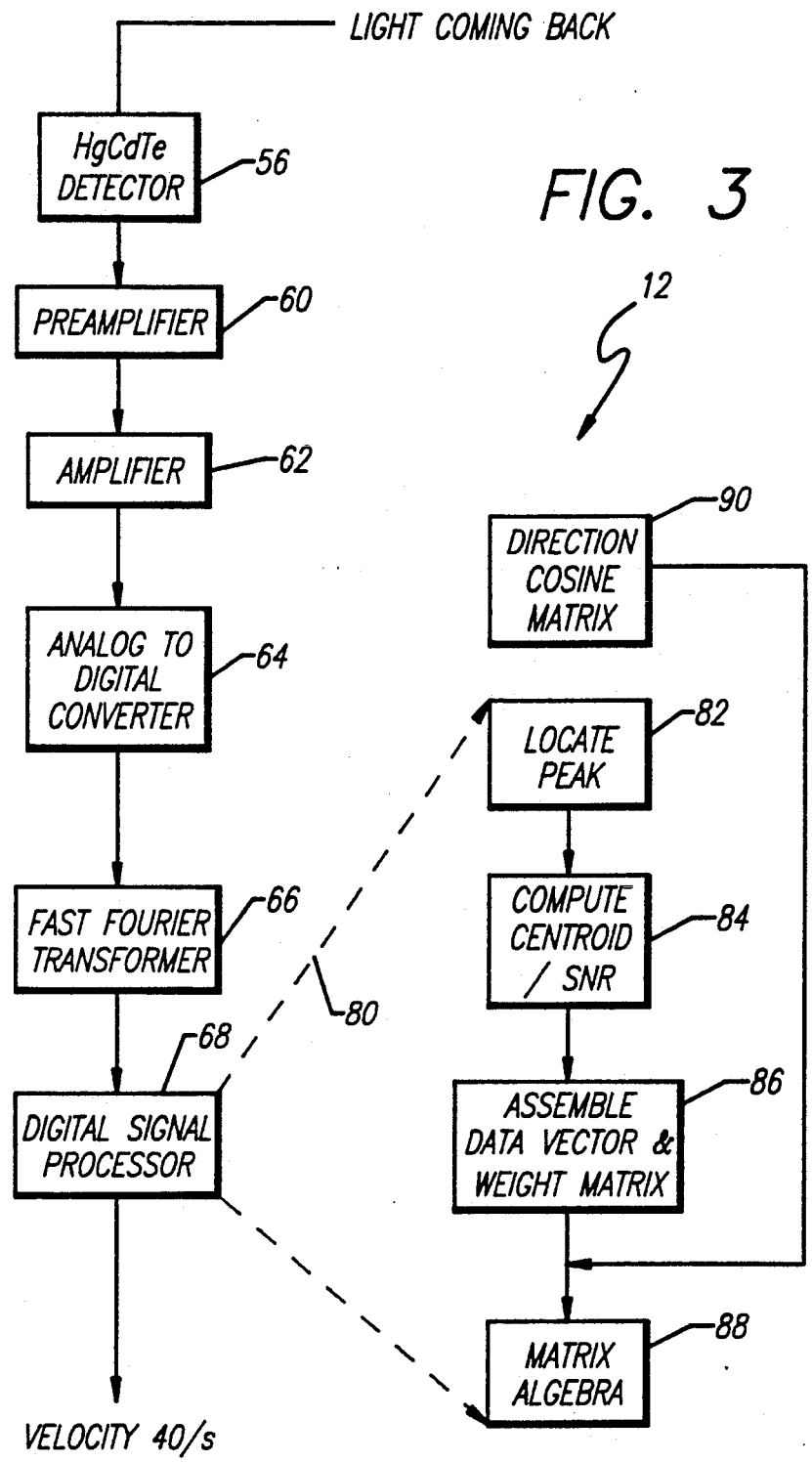
FIG. 3 is a schematic block diagram illustrating in additional detail the electrical stages included in the system shown in FIG. 1.
Figure 4:
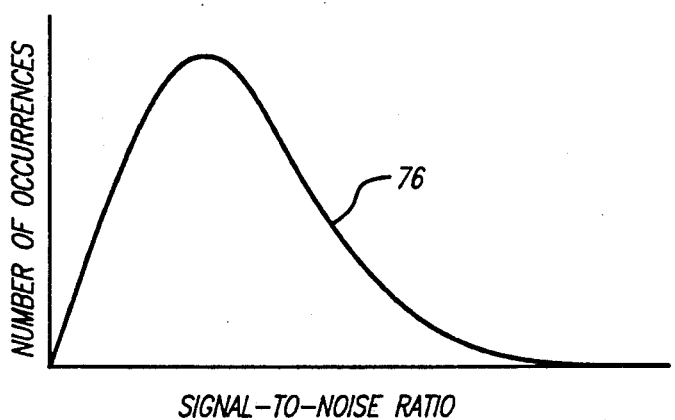
FIG. 4 is a curve illustrating a Rayleigh distribution curve showing the relationship between a signal-to-noise ratio along a horizontal axis and the number of occurrences of an event at progressive values of the signal-to-noise ratio.
Figure 6:
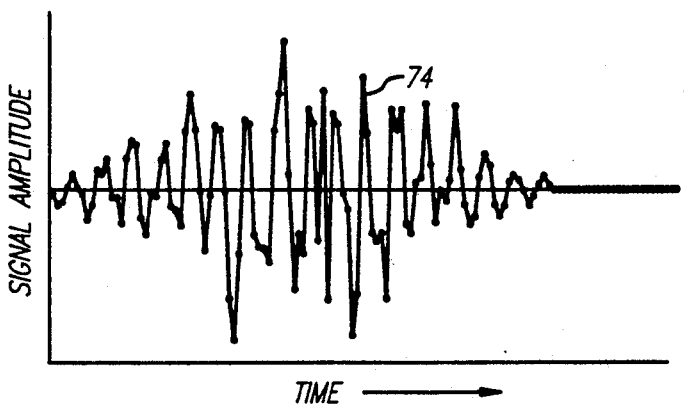
FIG. 6 is a curve illustrating the variations with time of the energy which is scattered by aerosol particles in successive pulses from the vehicle and which is received by the vehicle.
Figure 7:
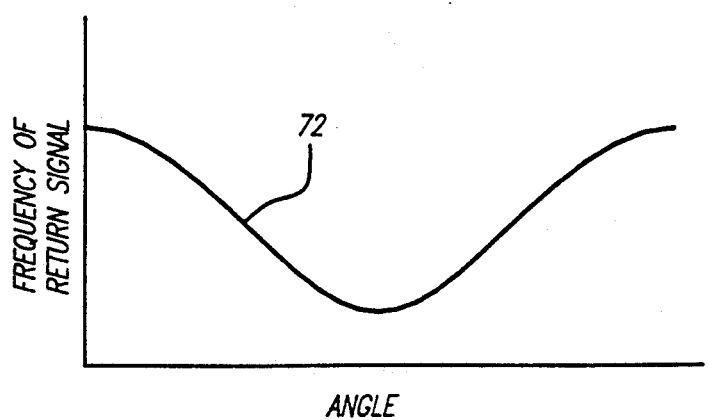
FIG. 7 is a curve illustrating the relationship between the angle at which successive pulses of energy are generated by the vehicle and the frequency of the energy which is scattered by the aerosol particles in the successive pulses and which is received by the vehicle.
Figure 9:
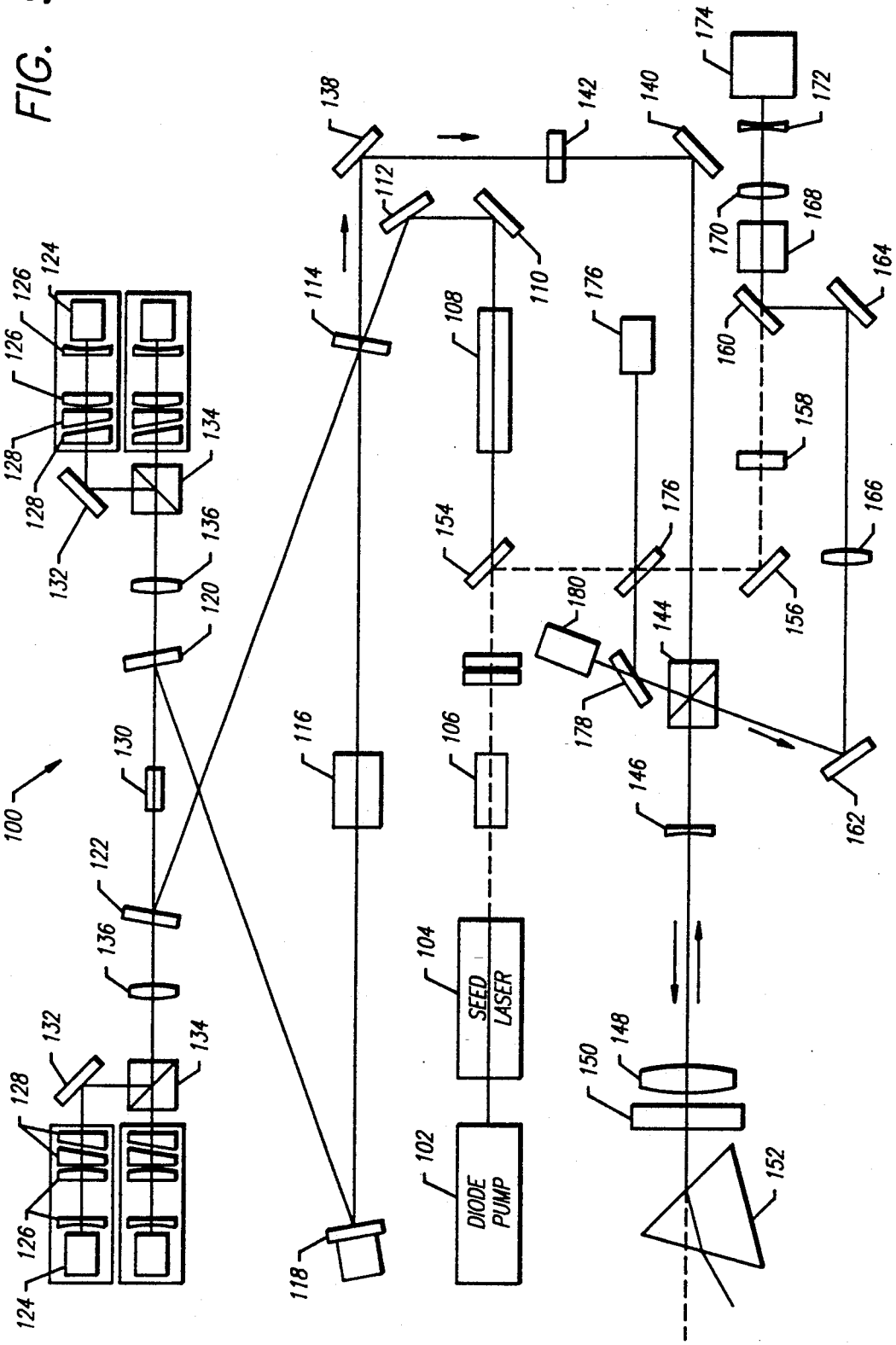
FIG. 9 is a diagram schematically illustrating another embodiment of the optical features of the invention.

FIG. 7 provides a curve 72 illustrating how the signals produced at successive instants of time by the system shown in FIGS. 1-3 vary in accordance with the changes in the angle of energy generation relative to the direction of movement of the vehicle. As will be seen, the frequency of the signals varies in a sinusoidal pattern through a complete revolution in the scan 14 (FIGS. 1 and 8). FIG. 6 provides a curve 74 illustrating how the amplitude of the signals produced at the airborne vehicle by the scattered light from the aerosol particles varies with time through a single revolution of scan. The curve 74 in FIG. 6 is obtained from a plurality of discrete measurements at progressive instants of time. Although the magnitude of the energy may vary in the curve 74 between successive measurements because of various factors including noise, it will be seen that the amplitudes of the signals produced at the airborne vehicle by the scattered light generally define a sinusoidal pattern.

The analysis of the different factors in a matrix relationship may be seen from the following discussion. The analysis is based upon the following relationship:

$$b=Dv \quad (1)$$

- b=the vector containing the velocity components of the aircraft 10 in each of the directions in which the energy pulses from the laser 30 are generated during one scan;
- v=the vector containing the velocity components of the aircraft 10 in a convenient coordinate system;
- D=the matrix of the direction cosines of the beam directions in the same coordinate system.

A weighting matrix W may be applied on both sides of equation (1) to reflect the quality of each of the measurements in b. This matrix improves the accuracy of the solution.

$$Wb=WDv \quad (2)$$

Equation (2) is a matrix relationship involving twelve (12) different measurements, each made at a different one of the twelve (12) different positions constituting a full revolution of a scan.

The value of each entry in W on each side of equation (2) represents the respective peak measurement relative to background noise for each of the twelve (12) different measurements in a conical scan.

The solution to equation (2) is $$v=(D^TW^2D)^{-1}D^TW^2b, \text{ where} \quad (3)$$

$D^T$ indicates a transposition of D.

In the matrix calculations represented by equation (3), cognizance is taken of certain factors in forming W. For example, a significant weighting factor may be the signal-to-noise ratio involved in each such measurement. A measurement involving a high signal-to-noise ratio is weighted more than a measurement involving a low signal-to-noise ratio. A factor affecting the signal-to-noise ratio may be the number of particles in the atmosphere around the airborne vehicle 10. The signal-to-noise ratio tends to increase with progressive increases in the number of particles in the atmosphere around the airborne vehicle 10. This is illustrated at 70 in FIG. 5. A curve such as the curve 70 in FIG. 5 is well known in the art.

FIG. 9 illustrates another embodiment, generally indicated at 100, of the laser and optical components of the invention for increasing the amount of power compared to the amount of power provided by the laser and optical components shown in FIG. 2. The embodiment 100 shown in FIG. 9 includes a diode pump 102 for a seed laser 104 constituting a continuous wave source at a frequency of approximately 201 microns. A Faraday isolator 106 isolates the seed laser 104 from any main cavity feedback. A Bragg cell 108 provides a precise shift in the frequency of the energy from the seed laser 104 to produce energy at a particular frequency. The Bragg cell 108 may constitute an acoustic block of quartz which operates like a diffraction grating to provide the precise frequency.

The energy from the Bragg cell 108 passes through a pair of mirrors 110 and 112 which are positioned to fold the beam of energy so that the embodiment 100 can be packaged within a relatively confined space. The light energy then passes through a cavity input/output mirror 114 which seeds the beam injection and provides an output coupling of the light energy to a Pockels cell 116 which constitutes an electro-optic polarizing switch. A piezo cavity tuning mirror 118 stabilizes the cavity length to maintain the coherence of the light energy.

Cavity mirrors 120 and 122 receive the light energy from the tuning mirror 118 and reflect the light energy to the cavity input/output mirror 114. Diode lasers 124 associated with the cavity mirrors 120 and 122 operate as optical pump sources. Pump system lens sets 126 provide a mode matching of the diode pump 102 to the main cavity including the cavity mirrors 120 and 122. Risley prisms 128 direct the energy beam into a thulium yHrium aluminum garnet (TmYAG) crystal 130. The crystal 130 amplifies the energy to produce a 7.5 mJ pulse having a duration of approximately one hundred nanoseconds (100 ns). This pulse has the mode stability of the seed laser 104 but considerably more power.

The laser 130 may emit energy pulses having approximately seventy five kilowatts of power at a wavelength of approximately 2.010 micrometers ($\mu$m) at a repetition rate of three hundred times per second (300/s). The total amount of power input may be about one hundred and twenty watts (120 W). Pump mirrors 132 may be disposed to redirect one pump train. Pump beam providers 134 may be disposed to combine pump polarizations efficiently. Pump beam lenses 136 may be provided to match the mode of the pump beam to the ring cavity.

The light from the cavity mirror 122 passes through the cavity input/output mirror 114 to folding mirrors 138 and 140. The mirrors 138 and 140 facilitate a compact packaging of the embodiment 100. A half wave polarizer 142 may be disposed between the folding mirrors 138 and 140 to prepare for a polarized transmission in a first direction of polarization of the light energy by a Glan prism 144 which is disposed on the output side of the mirror 140.

A diverging lens 146 and a converging lens 148 constitute a Galilean telescope to focus the beam from the lens 148 at a particular value such as approximately thirty meters (30 m). A quarter wave plate 150 minimizes internally generated flare signals. An isosceles prism 152 spins the energy beam pulses around a cone having a half angle of approximately thirty degrees (30°). In this way, successive pulses of energy at the rate of three hundred per second (300/s) define a cone in every twelve (12) pulses such that a complete conical revolution is provided twenty five times per second (25/s).

A reference beam sampler 154 acts as a local oscillator to extract a reference beam from the energy produced by the seed laser 104. A mirror 156 reflects and adjusts the reference beam. A half wave polarizer 158 aligns the polarization of the reference beam to that of the signal by rotating the polarization of the energy in a second (or "S") direction to a polarization of the energy in the first (or "P") direction such that the second direction is perpendicular to the first direction. The second signal in the second direction from the half wave polarizer 158 passes to a beam combiner 160.

The light scattered by the aerosol particles in the vicinity of the focussed beam are received by the rotating prism 152. This light passes through the quarter wave plate 150, the diverging lens 148 and the converging lens 156 to the Glan prism 144. The Glan prism 144 directs the light to a pair of mirrors 162 and 164 which reflect and adjust the received light energy. A lens 166 may be disposed between the mirrors 162 and 164 to match the wavefront of the received energy with the wavefront of the reference beam of energy passing to the beam combiner 158.

The light from the mirror 164 passes to the beam combiner 158 for mixing with the reference beam of energy. A Glan prism 168 removes any residual polarization in the second (or "S") direction. A converging lens 170 and a diverging lens 172 match the dimensions of the mixed beams to the dimensions of a detector 174. The detector 174 corresponds to the detector 56 in FIG. 2.

A beam splitter 176 splits the energy from the reference beam sampler 154 into two (2) portions. Some of the split energy is introduced to a detector 176 which measures the offset frequency of the seed beam from the seed laser 104 and the frequency of the signal from the main laser including the TmYAG crystal 130. A beam splitter 178 reflects a small percentage of the outgoing light in the laser beam in the second (or "S") direction of polarization and introduces this light to a detector 180. The detected signal is used to drive the piezo-tuned mirror 118 to control the cavity length of the mirror for controlling the coherence of the energy beam from the main laser 130.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for use in an airborne vehicle for determining the speed of the airborne vehicle relative to aerosol particles in the vicinity of the airborne vehicle,
   first means for providing pulses of coherent energy at a particular frequency,
   second means responsive to the pulses of coherent energy from the first means for generating pulses of coherent energy along a particular optical axis for scattering by the particles,
   third means for receiving the energy scattered in the pulses by the aerosol particles as a result of the generation of the energy pulses by the second means, and
   fourth means for operating upon pulses of coherent energy from the first means and the energy received in the pulses from the third means, during the generation of the energy in the pulses by the second means, for determining the speed of the airborne vehicle relative to the aerosol particles.

2. In a combination as set forth in claim 1 wherein
   the fourth means operates in accordance with the Doppler frequency principles with respect to the characteristics of the scattered energy pulses relative to the provided energy pulses to determine the speed of the airborne vehicle relative to the aerosol particles along the particular axis.

3. In combination for use in an airborne vehicle for determining the speed in the atmosphere of the airborne vehicle relative to aerosol particles in the vicinity of the airborne vehicle.

first means for providing pulses of coherent energy at a particular frequency, second means for generating the energy pulses along a particular optical axis for scattering by the particles, third means for receiving the energy pulses scattered by the particles during the generation of the energy pulses, and fourth means for operating upon the provided energy pulses and the scattered pulses for determining the speed of the airborne vehicle relative to the aerosol particles, the second means generating the pulses of coherent energy in a particular repetitive spatial pattern and the fourth means being responsive to the provided pulses of energy scattered in the particular repetitive spatial pattern to determine the speed of the airborne vehicle relative to the aerosol particles.

4. In a combination as set forth in claim 3 wherein the first means provides the pulses of coherent energy in the infrared bandwidth.

5. In a combination as set forth in claim 1, the third means being operative, during the provision of the energy in the pulses by the first means, to receive the energy scattered in the pulses by the aerosol particles.

6. In combination for use in an airborne vehicle for determining the speed of the airborne vehicle relative to aerosol particles in the vicinity of the airborne vehicle, first means for providing pulses of energy in a particular bandwidth at a first particular frequency, second means for generating the pulses of energy into the atmosphere in a particular spatial pattern variable on a recursive basis at a second particular frequency different from the first particular frequency, third means for receiving the energy pulses scattered by the aerosol particles as a result of the generation of such energy pulses, and fourth means responsive to the energy pulses received by the third means from the particles during the generation of such energy pulses for operating upon such energy pulses in accordance with the spatial pattern of such received pulses and the frequency of the energy in such received pulses to determine the speed of the airborne vehicle relative to the aerosol particles in the vicinity of the airborne vehicle.

7. In a combination as set forth in claim 6, the fourth means including fifth means for forming a matrix of the energy pulses received by the third means in accordance with the spatial pattern of the pulses generated by the second means on the recursive basis and further including sixth means for operating upon the matrix of the energy pulses to determine the speed of the airborne vehicle relative to the aerosol particles in the vicinity of the airborne vehicle.

8. In a combination as set forth in claim 7, means for weighting the matrix formed by the fifth means to facilitate the operation of the sixth means in determining the speed of the airborne vehicle relative to the aerosol particles in the vicinity of the airborne vehicle.

9. In a combination as set forth in claim 8, the fourth means including means for digitizing the energy pulses received by the third means and further including means for providing a frequency analysis of the digitized energy pulses.

10. In combination for use in an airborne vehicle for determining the speed of the airborne vehicle relative to aerosol particles in the vicinity of the airborne vehicle, first means for providing at a particular frequency pulses of coherent energy having a particular bandwidth, second means for generating the pulses of coherent energy in a spatial pattern progressively variable in a closed loop at a second particular frequency different from the first particular frequency to obtain a scattering of the energy in the pulses by the particles, third means for receiving the energy in the pulses scattered by the particles, and fourth means for operating upon the received pulses in accordance with the generation of the pulses in the spatial pattern progressively variable in the closed loop to determine the vectorial speed of the airborne vehicle relative to the aerosol particles in the vicinity of the airborne vehicle.

11. In a combination as set forth in claim 10, the fourth means being operative to determine the speed of the airborne vehicle relative to the aerosol particles in the vicinity of the airborne vehicle in accordance with the absolute speed determined for the airborne vehicle and the angle of generation of the energy pulses from the airborne vehicle relative to the direction of movement of the airborne vehicle.

12. In a combination as set forth in claim 11, the fourth means being operative to weight the determinations by the fourth means to facilitate the determination of the speed of the airborne vehicle relative to the aerosol particles in the vicinity of the airborne vehicle.

13. In a combination as set forth in claim 12, the fourth means being operative to weight the determinations by the fourth means of the airborne vehicle relative to the aerosol particles in the vicinity of the airborne vehicle in accordance with the amplitudes of the energy pulses received by the third means and the signal-to-noise ratio of such energy pulses.

14. In a combination as set forth in claim 12, the fourth means being operative to weight the determinations by the fourth means of the airborne particles relative to the aerosol particles in the vicinity of the airborne vehicle in accordance with the relative angles in which the pulses of coherent energy are generated from the airborne vehicle.

15. In a combination as set forth in claim 13, the first means being operative to produce the pulses of coherent energy in the infrared band.

16. In combination for use in an airborne vehicle for determining the speed of an airborne vehicle relative to aerosol particles in the vicinity of the airborne vehicle, first means for providing at a particular frequency pulses of energy having a particular bandwidth, second means for generating the pulses of energy into the atmosphere in a particular spatial pattern having recursive properties to obtain a scattering of the energy in the pulses by the aerosol particles in a bandwidth different from the particular bandwidth, third means for receiving the scattered pulses of energy while the energy pulses are still being generated, and fourth means responsive to the received pulses and the generated pulses for determining the speed of the airborne vehicle relative to the aerosol particles in the vicinity of the airborne vehicle.

17. In a combination as set forth in claim 16, the second means generating the pulses of energy into the atmosphere in a spatial pattern defining an axis and defining progressive conical positions around the axis with progressive pulses of energy at the particular frequency.

18. In a combination as set forth in claim 17, the fourth means being responsive to the received pulses of energy in accordance with the spatial pattern of the received pulses to determine the speed of the airborne vehicle relative to the aerosol particles in the vicinity of the airborne vehicle.

19. In a combination as set forth in claim 18, the fourth means providing a matrix dependent upon the number of the pulses received by the third means in the spatial pattern and upon the angle of the pulse generation relative to the direction of movement of the airborne vehicle to determine the speed of the airborne vehicle relative to the aerosol particles in the vicinity of the airborne vehicle.

20. In combination for use in an airborne vehicle for determining the speed of an airborne vehicle relative to aerosol particles in the vicinity of the airborne vehicle, first means for providing at a particular frequency pulses of energy having a particular bandwidth, second means for generating the pulses of energy into the atmosphere in a pattern defining progressive positions in a closed loop repetitive at a second particular frequency different from the first particular frequency to obtain a scattering of the energy in the pulses by the particles, third means for receiving energy in the scattered pulses, and fourth means responsive to the provided pulses and the pulses scattered by the particles and responsive to the angle defined by the pulses generated in the closed loop relative to the direction of movement of the airborne vehicle for determining the speed of the airborne vehicle relative to the aerosol particles in the vicinity of the airborne vehicle.

21. In a combination as set forth in claim 20, the fourth means providing the determination of the speed of the airborne vehicle relative to the aerosol particles in the vicinity of the airborne vehicle at a time after the generation of each of the pulses of coherent energy by the second means into the atmosphere and the scattering of such energy pulses by such particles to the third means.

22. In a combination as set forth in claim 20, the fourth means including means responsive to the scattered energy pulses for determining the absolute speed of the airborne vehicle in each of the progressive positions in the closed loop and means for defining a matrix defined by the absolute speed determined for the airborne vehicle in the progressive positions in the closed loop and further defined by the progressive angular positions in the closed loop for determining the speed of the airborne vehicle relative to the aerosol particles in the vicinity of the airborne vehicle.

23. In a combination as set forth in claim 22, means for weighting the matrix to facilitate the determination by the fourth means of the speed of the airborne vehicle relative to the aerosol particles in the vicinity of the airborne vehicle.

24. In a combination as set forth in claim 23, the first means providing coherent energy in the infrared range.

25. In a method of determining the speed of an airborne vehicle relative to aerosol particles in the vicinity of the airborne vehicle, the steps of:

providing pulses of laser energy from the airborne vehicle at a first particular frequency, providing a conical scanning of the energy pulses at a second particular frequency different from the first particular frequency to obtain a scattering of the energy in the pulses by the aerosol particles, receiving the scattered energy in the pulses at the airborne vehicle, and processing the energy in the provided pulses and the energy in the received pulses to determine the speed in the atmosphere of the airborne vehicle relative to the aerosol particles.

26. In a method as set forth in claim 25 wherein the processing includes a determination of the difference between the first particular frequency and the frequency of the scattered energy received at the airborne vehicle.

27. In a combination as set forth in claim 25 wherein the pulses of laser energy are provided in the infrared bandwidth.

28. In a method as set forth in claim 25 wherein the processing includes a determination of the difference between the first particular frequency and the frequency of the scattered energy received at the airborne vehicle and the amplitude of the received energy pulses from the standpoint of the spatial pattern of such amplitude.

29. In a method as set forth in claim 26 including the steps of forming a matrix of the received energy pulses in accordance with the spatial pattern of the scanned energy pulses and operating upon the matrix to determine the speed of the airborne vehicle relative to the aerosol particles in the vicinity of the airborne vehicle.

30. In a method as set forth in claim 25, the steps of digitizing the received energy pulses, and providing a frequency analysis of the digitized energy pulses.

31. In combination for use in an airborne vehicle for determining the speed of the airborne vehicle relative to aerosol particles in the vicinity of the airborne vehicle, first laser means for providing pulses of coherent energy at a particular frequency, second laser means responsive to the pulses of coherent energy from the first laser means for generating pulses of coherent energy along a particular optical axis for scattering by the particles, third means for receiving the energy scattered in the pulses by the aerosol particles as a result of the generation of the energy pulses by the second means, and fourth means for operating upon the pulses provided by the first laser means and the energy received in the pulses from the third means for determining the speed of the airborne vehicle relative to the aerosol particles.

32. In a combination as set forth in claim 31 wherein the fourth means operates in accordance with Doppler frequency principles with respect to the characteristics of the scattered energy pulses relative to the provided energy pulses to determine the speed of the airborne vehicle.

33. In a combination as set forth in claim 32 wherein the second means generates the pulses of coherent energy in a particular repetitive spatial pattern and wherein the fourth means is responsive to the pulses of coherent energy from the first means and the pulses of energy scattered in the particular repetitive spatial pattern to determine the speed of the airborne vehicle relative to the aerosol particles.

34. In a combination as set forth in claim 33 wherein the first means provides the pulses of coherent energy in the infrared bandwidth.

35. In a combination as set forth in claim 31 wherein the second means generates the pulses of energy into the atmosphere in a spatial pattern defining an axis and defining progressive conical positions around the axis with progressive pulses of energy at the particular frequency.

36. In a combination as set forth in claim 35 wherein the fourth means provides a matrix dependent upon the number of pulses received by the third means in the spatial pattern and upon the angle of the pulse generation relative to the direction of the airborne vehicle to determine the speed of the airborne vehicle relative to the aerosol particles in the vicinity of the airborne vehicle.

37. In a combination as set forth in claim 31 wherein the fourth means is operative to weight the determinations by the fourth means to facilitate the determination of the speed of the airborne vehicle relative to the aerosol particles in the vicinity of the airborne vehicle.

38. In a combination as set forth in claim 31 wherein the fourth means is operative to weight the determinations by the fourth means of the airborne vehicle relative to the aerosol particles in the vicinity of the airborne vehicle in accordance with the amplitudes of the energy pulses received by the third means and the signal to noise ratio of such energy pulses and in accordance with the relative angles in which the pulses of coherent energy are generated from the airborne vehicle.

* * * * *